(No Model.)
J. A. ROGERS.
EARMARK.
No. 492,838. Patented Mar. 7, 1893.
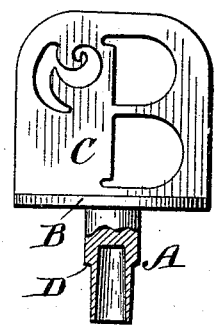
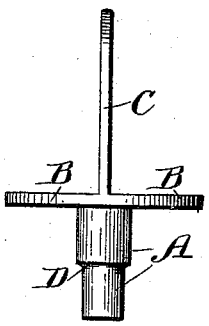
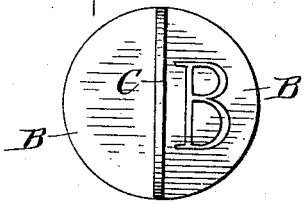
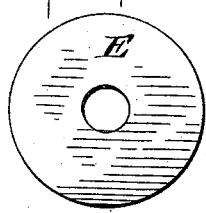
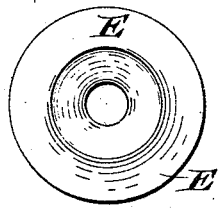
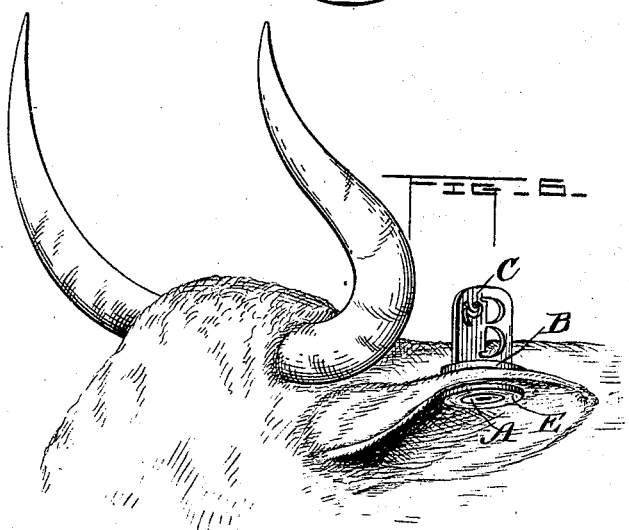
Witnesses
Severance
Geo. S. Kincaid
Inventor
James A. Rogers
by John Wedderburn
his Attorney
THE NORRIS PETERS CO., PHOTO-LITHO., WASHINGTON, D. C.

UNITED STATES PATENT OFFICE.

JAMES A. ROGERS, OF GLENCOE, NEBRASKA.

EARMARK.

SPECIFICATION forming part of Letters Patent No. 492,838, dated March 7, 1893.

Application filed June 18, 1892. Serial No. 437,181. (No model.)

*To all whom it may concern:*

Be it known that I, JAMES A. ROGERS, of Glencoe, in the county of Dodge and State of Nebraska, have invented certain new and useful Improvements in Earmarks; and I do hereby declare the following to be a full, clear, and exact description of the invention, such as will enable others skilled in the art to which it appertains to make and use the same.

My invention relates to an improved ear-mark for marking cattle to distinguish their ownership, the object of my invention being to provide an ear-mark which can be recognized at a much greater distance than is the case with those at present in use, and my invention more particularly resides in the novel construction, combination and arrangement of parts hereinafter fully specified and pointed out in the claims.

In the accompanying drawings, Figure 1 is a side view of the ear-mark proper, the lower part of the hollow stem being in section. Fig. 2 is a side view thereof taken endwise of the upright part which carries the distinguishing symbols. Fig. 3 is a plan view thereof. Fig. 4 is a top plan view of the washer. Fig. 5 is a bottom plan view of the same, and Fig. 6 shows the ear-mark attached to the ear of the animal.

My improved ear-mark consists of a stem A adapted to pierce the ear of the animal, a disk B upon the stem, the underside of which disk lies flat against the animal's ear, and an upright plate C which is perforated to show the distinguishing symbols of ownership. These marks may be in the form of either letters or figures, or they may be any other arbitrary signs, but the important feature of my invention is that the marks are perforated or otherwise stamped or formed upon a plate which stands out from the ear of the animal so as to present a surface readily visible without the necessity of a close inspection. For greater certainty the marks may also be stamped or formed upon the flat disk-like part B, which lies against the surface of the ear. The stem A which is thrust through the ear of the animal is provided with a shoulder D, and, when the stem has been so placed in position, a washer E is slid upon it under the ear, until the washer abuts against the shoulder D. The washer is then riveted in position by spreading the end of the hollow stem behind the washer.

In order to more conveniently perform the operation of affixing the ear-mark, I have also invented a special form of pliers to be used therewith, which invention forms the subject of an application for patent (Serial No. 437,180) filed June 18, 1892; but the device for affixing the ear-mark forms no part of my present application, which is restricted to the new and improved form of ear-mark, by whatever means it may be secured in place.

Having thus fully described my invention, what I claim, and desire to secure by Letters Patent, is—

1. In an ear-mark, the combination of a plate or disk adapted to lie flat against the ear, a perforated plate, secured to the center of the first plate and at right angles to it, and a rivet secured to the bottom of the first plate, said rivet adapted to secure the mark to the ear of an animal, substantially as and for the purpose described.

2. In an ear-mark, the combination of a hollow stem, a flange or plate upon the stem, a perforated plate at right angles to the flange or plate, and a washer perforated centrally, to receive the end of said stem, substantially as described.

In testimony whereof I have signed this specification in the presence of two subscribing witnesses.

JAMES A. ROGERS.

Witnesses:
S. LAUT,
WILLIAM BUNN.